July 31, 1923.
E. G. KNUDTSON
1,463,776
HOG HOLDER AND PIG PULLER
Filed Aug. 25, 1921
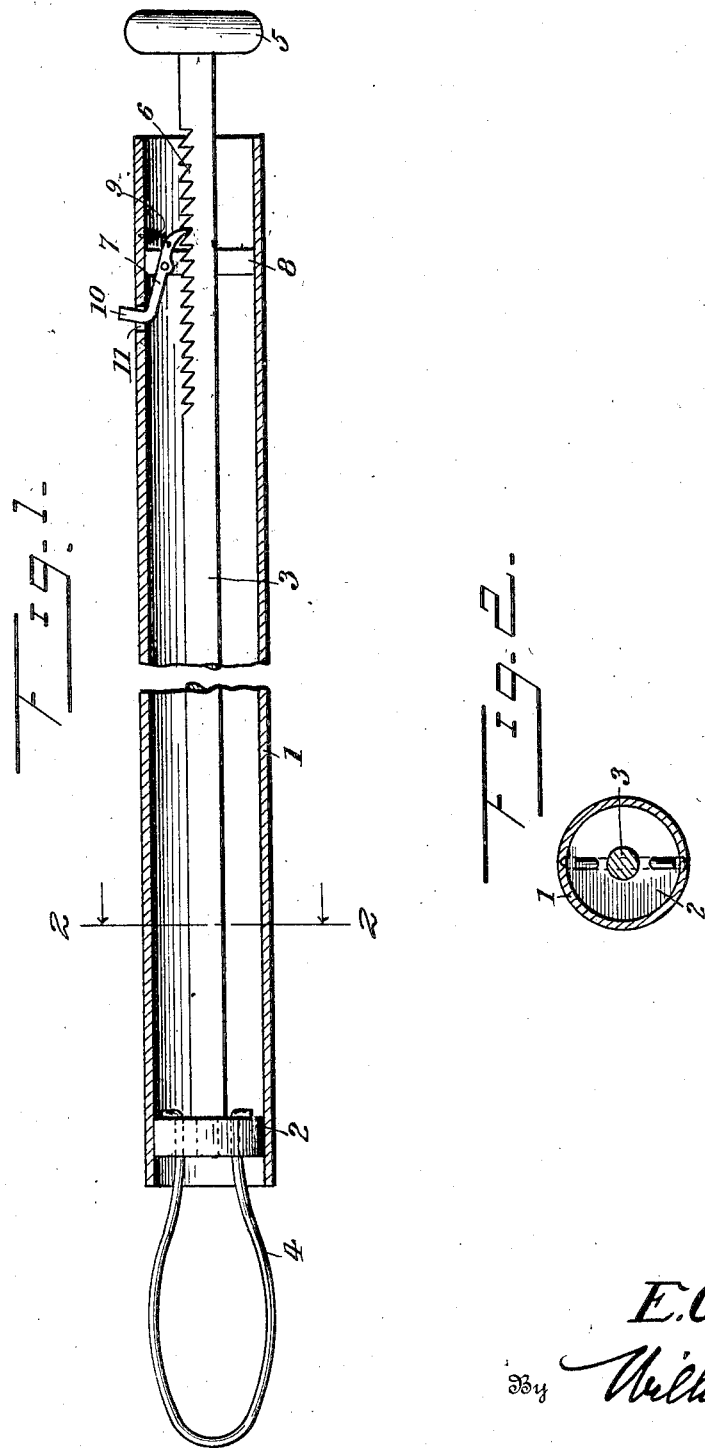
Inventor
E. G. Knudtson
By *William J. Jaski*
Attorney Patented July 31, 1923.

1,463,776

UNITED STATES PATENT OFFICE.

EDWARD G. KNUDTSON, OF STANTON, NEBRASKA, ASSIGNOR TO WILLIAM BECKER, OF SIDNEY, NEBRASKA.

HOG HOLDER AND PIG PULLER.

Application filed August 25, 1921. Serial No. 495,198.

*To all whom it may concern:*

Be it known that EDWARD G. KNUDTSON, a citizen of the United States, residing at Stanton, in the county of Stanton and State of Nebraska, has invented certain new and useful Improvements in Hog Holders and Pig Pullers, of which the following is a specification.

This invention relates to new and useful improvements in animal husbandry, and more particularly to a tool known as a hog holder and pig puller, and the primary object of the invention is to provide a simple device of this character which will catch and hold the hog or pig by the nose, or otherwise if desired.

A further object of the invention resides in providing a device of this character which will eliminate the troublesome work heretofore encountered in catching and holding hogs and pigs.

A still further object resides in providing a device provided with a loop or snare which may be readily grasped about the nose of the animal and withdrawn to tightly hold same for any purpose desired.

A still further object resides in providing a device which is simple and durable in construction, inexpensive to manufacture, and one which will be very efficient and useful in operation.

With these and other objects in view, my invention consists in the novel features of construction, combination and arrangement of parts as will be hereinafter referred to and more particularly pointed out in the specification and claims.

In the accompanying drawing forming a part of this application—

Figure 1 is a longitudinal section through a device constructed in accordance with my invention, and Figure 2 is a transverse section therethrough, as seen on line 2—2 of Figure 1.

In describing the invention I shall refer to the drawing in which similar reference characters designate corresponding parts throughout the several views, and in which 1 designates a tubular member of any preferred size through which is adapted to operate a plunger comprising a head or piston 2 which fits and operates snugly in the tubular member and a rod 3 connected therewith in any preferred manner. A loop or snare 4 formed of flexible spring steel wire is carried on the head member 2 of the plunger and is adapted to project beyond the one end of the tubular member 1, as clearly shown in Figure 1. This loop or snare is adapted to be engaged with the nose of the hog or pig and drawn inwardly toward the tubular member to hold the animal firmly. A handle member 5 is carried on the outer end of the rod 3 for operating the latter, and said rod is provided with a toothed rack 6 intermediate of its ends, the teeth of which are adapted to be engaged by a pivoted pawl 7. This pawl is pivoted intermediate of its end on a guide bar 8 within the tubular member 1 adjacent the end thereof nearest the handle member 5 and a coil spring 9 engaged within the tubular member and with the pawl adjacent one end of the latter, is adapted to normally force said pawl in engagement with the teeth of the rack 6, thereby retaining the plunger and the snare or loop 4 in any adjusted position. The end of the pawl 7 is bent angularly as shown at 10 and disposed outwardly through an opening 11 formed in the tubular member 1. Thus the operator may force downwardly on the end 10 of the pawl 7 and disengage the latter from the rack 6 and the plunger may be disposed to any position desired.

In the catching and holding of pigs and hogs, considerable difficulty has heretofore been experienced and my device is provided to overcome this difficulty. It is apparent that when the snare or loop is engaged with the nose of the animal and withdrawn the animal will be securely held. As a pig puller, it is obvious that this device may be applied to use without injuring the mother and it is so constructed that the hold cannot slip from the pig, although when applied to such use, it may be desirable to reduce the size of the device.

From the foregoing description of my improved device the operation thereof will be readily understood and it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to without departing from the spirit or sacrificing any of the principles of the invention.

Having thus described my invention, what I claim is:

1. A device of the class described comprising a tubular member, a plunger therein comprising a head member slidably mounted in said tubular member, a rod engaged with said head member, a handle carried at the outer end of said rod, a flexible loop carried on said head member and adapted to project beyond the one end of said tubular member, a guide bar in the said tubular member, a ratchet formed on said rod adjacent the handle member and a spring operated pawl carried on said guide bar adapted to engage said ratchet to retain the plunger and loop in various adjusted positions.

2. A device of the class described comprising a tubular member having an opening therein adjacent one end thereof, a guide bar in the said tubular member, a plunger comprising a head slidably mounted in said tubular member and a rod secured to said head, a handle carried at the outer end of said rod, a flexible loop engaged with said head and adapted to project beyond the end of said tubular member, a ratchet formed on said rod adjacent the handle member thereon, a pawl pivoted intermediate of its ends on said guide bar, spring means for normally retaining the pawl in engagement with the ratchet, whereby to retain said plunger and loop in various adjusted positions, and an angularly bent portion on said pawl disposed through the opening in said tubular member whereby to manually disengage said pawl from the ratchet.

In testimony whereof I affix my signature.

EDWARD G. KNUDTSON.